(No Model.)
T. R. CRANE.
TUBE FOR GRAIN OR FERTILIZER DRILLS.
No. 364,577. Patented June 7, 1887.
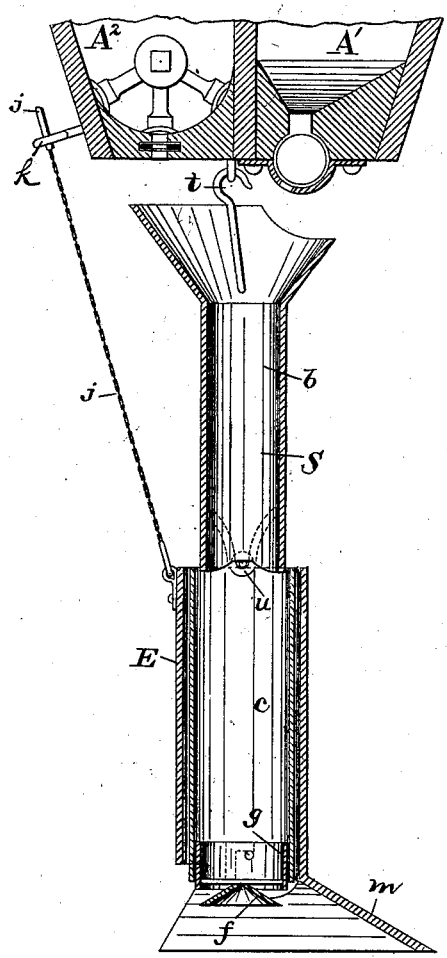
Fig. 1.
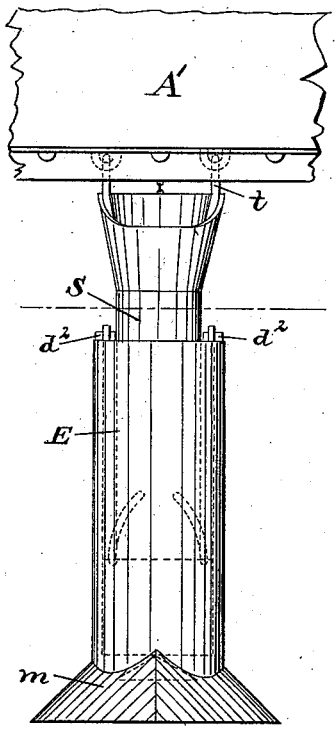
Fig. 2.
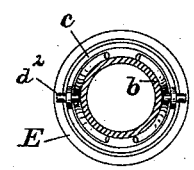
Fig. 3.
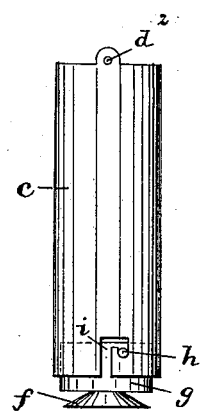
Fig. 4.
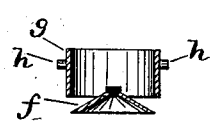
Fig. 5.
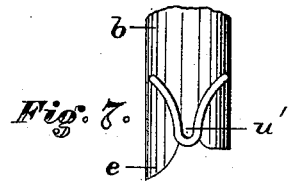
Fig. 6.
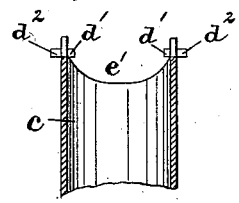
Fig. 7.
Fig. 8.
WITNESSES:
J. K. E. Diffenderffer.
John E. Morris.
INVENTOR:
Thos. R. Crane
BY Chas. B. Mann
ATTORNEY.

UNITED STATES PATENT OFFICE.

THOMAS R. CRANE, OF HEATHSVILLE, VIRGINIA.

TUBE FOR GRAIN AND FERTILIZER DRILLS.

SPECIFICATION forming part of Letters Patent No. 364,577, dated June 7, 1887.

Application filed April 14, 1887. Serial No. 234,740. (No model.)

*To all whom it may concern:*

Be it known that I, THOMAS R. CRANE, a citizen of the United States, residing at Heathsville, in the county of Northumberland and State of Virginia, have invented certain new and useful Improvements in Drill-Tubes for Grain and Fertilizer Drills, of which the following is a specification.

This invention relates to certain improvements in drill-tubes for grain and fertilizer drills.

The invention is illustrated in the accompanying drawings, in which—

Figure 1 is a vertical section of the hoppers and drill-tube, the latter extended. Fig. 2 is a front view of the hopper and drill, the latter occupying a raised position. Fig. 3 is a cross-section of the conveyer-tube. Fig. 4 is a side view of the lower section of the conveyer-tube with the detachable spreader-disk. Figs. 5 and 6 are views of the detachable spreader-disk. Figs. 7 and 8 are detail views of the upper and lower sections of the conveyer-tube.

The letters $A'$ $A^2$ designate hoppers for grain and fertilizer. Each hopper has a suitable feed device, not necessary to describe here.

The letter E designates an ordinary drill-tube, such as are attached to grain and fertilizer drills. This tube has a shoe, $m$, which opens the furrow for the grain.

Each drill-tube E is raised and lowered vertically by a chain, $j$, having at its upper end a ring, $j'$, which, when the tube is down, rests on a suitable support, $k$, back of the hopper. I employ a jointed metal tube, S, to convey the grain or fertilizer from the hopper to the drill-tube.

The feature of novelty here shown relates to the means for raising the lower section of the conveyer-tube and sliding it telescopically on the upper section, and to the detachable spreader-disk.

The upper section, $b$, of the conveyer-tube is smaller than the lower section, $c$, so that the latter can surround the former, and the two are connected by a special joint, $u$, which is so contrived as to allow the hinging or joint movement, and also the telescopic movement. On the bottom of the upper section of the tube is a joint-bearing, $u'$, having a V shape. This section has two such bearings—one diametrically opposite the other. The lower or crotch part of the said V serves as a bearing for the pivot-pins $d$ on the top of the lower tube-section. The two pivot-pins $d$ project both on the inside and outside of the lower tube-section, $c$. The end $d'$ of the pin, which projects on the inside, finds a seat, as already stated, in the lower or crotch part of the V-bearing, while the end $d^2$, which projects on the outside, serves as a stop against which the top edge of the drill-tube E comes when it is raised by the chain $j$. In practice the drill-tubes are usually attached to a drag-bar, or, as shown in several of my applications for patents, to a crosswise bar.

It will be seen that the jointed conveyer-tube hangs below the hopper-bottom by the hook or eye $t$. The lower tube-section, $c$, hangs from the upper section by the pivot-pin ends $d'$, resting in the V-bearing. Thereby the lower tube-sections, $c$, may be raised and slid telescopically on the upper tube-section, $b$. This raising and telescopic movement of the lower tube-section may be effected by any suitable means—as a chain attached directly to the lower tube-section, or, as shown, by drawing on the drill-tube chain $j$. When the drill-tube is raised, its top edge will come against the stop-pins $d^2$, and thereby the lower tube-section will be raised, the pivot ends $d'$ of the pins being lifted out of the said V-bearings. When the drill-tube and lower tube-section are lowered, the pivot ends $d'$ will readily pass down into the upper broad part of the V-bearing and again be seated in the crotch part thereof.

The bottom end of the upper tube-section, $b$, preferably has an extension-tip, $e$, at one side. (See Fig. 7.) This extension-tip has a rounded or curved bottom edge, and in breadth extends from the joint-bearing $u'$ at one side of the tube to the bearing on the opposite side. To co-operate with this construction, the top end of the lower tube-section, $c$, is cut away, as at $e'$. (See Fig. 8.) It will be seen that when the two sections being thus constructed bend or turn at the joint $u$ one way, the extension-tip $e$ will pass out of the cut-away $e'$, and when the two sections bend or turn at the joint the other way the cut-away $e'$ will allow the parts to have a greater movement, and when the two sections hang normally, the extension-tip $e$ serves to close the cut-away $e'$.

A detachable spreader-disk, $f$, is provided and combined with the conveyer-tube S. This disk $f$ is convex on its upper side, and is attached to the lower end of the conveyer-tube in any suitable way that will permit it to be readily detached, so that it may be used when desired or removed at any time.

In the present instance the disk is attached by the following construction: The disk $f$ has a ring or band, $g$, secured to it in such manner (see Figs. 5 and 6) that grain passing first down through the ring will strike on top of the disk and pass below the ring and out sidewise. The ring has two pins, $h$, and the lower end of the conveyer-tube S has two right-angled slots, $i$. This attaching device is similar to the well-known bayonet-clasp coupling. It will be seen that the two pins $h$ on the disk-ring may be readily engaged with the slots on the tube or disengaged.

Grain, seed, or fertilizer passing down the conveyer-tube will strike on the convex disk $f$, and thereby will be scattered or spread below the shoe $m$ in the open furrow.

Having described my invention, I claim and desire to secure by Letters Patent of the United States—

1. A conveyer-tube for grain-drills, made in sections, one of which is smaller than the other, to admit of the two sections sliding telescopically, and a pivot or hinge-joint to connect the two sections when extended.

2. A conveyer-tube for grain-drills, made in sections, one of which is smaller than the other, to admit of the two sections sliding telescopically, and a pivot or hinge-joint to connect the two sections when extended, in combination with a drill-tube, for the purpose set forth.

3. A conveyer-tube for grain-drills, made in sections, one of which is smaller than the other, to admit of the two sections sliding telescopically, the upper tube-section having V-shaped bearings, and the lower tube-section provided with pivot-pins to be seated in said bearings, for the purpose set forth.

4. A conveyer-tube for grain-drills, made in sections, one of which is smaller than the other, to admit of the two sections sliding telescopically, the upper tube-section having V-shaped bearings, and the lower tube section provided with pivot-pins which project both inside and outside, in combination with a drill-tube whose top edge comes against the outside projecting ends of the said pins, and means, substantially as described, for raising the drill-tubes.

5. In a drill-tube, the combination of an upper tube section having at its bottom end an extension tip, $e$, a lower tube-section having at its top end a cut-away, $e'$, corresponding with said extension-tip, and a hinge-joint connecting the two sections, for the purpose set forth.

6. The combination of a drill-tube, E, a conveyer-tube, S, and a detachable spreader-disk, $f$, for the purpose set forth.

7. The combination of a drill-tube, E, a conveyer-tube, S, a separate spreader-disk, $f$, and means, substantially as described, whereby to detachably secure the said disk to the conveyer-tube.

8. The combination of a drill-tube, E, a conveyer-tube, S, and a spreader-disk, $f$, having a ring or band, $g$, and detachably secured to the lower end of said conveyer-tube, for the purpose set forth.

In testimony whereof I affix my signature in presence of two witnesses.

THOMAS R. CRANE.

Witnesses:
JOHN E. MORRIS,
JNO. T. MADDOX.